(12) United States Patent
Lai et al.

(10) Patent No.: US 8,082,816 B2
(45) Date of Patent: Dec. 27, 2011

(54) GEAR-SHIFTING STRUCTURE FOR VEHICLE

(75) Inventors: Chien-Hung Lai, Kaohsiung (TW); Chao-Chang Ho, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 840 days.

(21) Appl. No.: 12/168,922

(22) Filed: Jul. 8, 2008

(65) Prior Publication Data
US 2009/0308710 A1 Dec. 17, 2009

(30) Foreign Application Priority Data
Jun. 11, 2008 (TW) .............................. 97121710 A

(51) Int. Cl.
*F16H 59/00* (2006.01)
*F16H 1/16* (2006.01)
(52) U.S. Cl. ......................................... 74/337.5; 74/425
(58) Field of Classification Search ................. 74/337.5, 74/425
See application file for complete search history.

(56) References Cited

U.S. PATENT DOCUMENTS

| 4,945,780 | A | * | 8/1990 | Bosma | 74/337.5 |
| 5,862,705 | A | * | 1/1999 | Lee | 74/337.5 |
| 6,220,109 | B1 | * | 4/2001 | Fischer et al. | 74/337.5 |
| 7,467,564 | B2 | * | 12/2008 | Baldwin et al. | 74/337.5 |
| 7,694,598 | B2 | * | 4/2010 | Kriebernegg et al. | 74/337.5 |

* cited by examiner

*Primary Examiner* — Ha D. Ho
(74) *Attorney, Agent, or Firm* — Leong C. Lei

(57) ABSTRACT

A gear-shifting structure is provided for a vehicle. The vehicle includes a transmission box that contains therein a gear train, a clutch, a switching fork, a gear-shifting hub, and a motor. The motor cooperates with a worm shaft to actuate the clutching operation of the clutch and to cause movement of the gear-shifting hub in order to carry out the gear shifting operation. The motor has a rotary member that drives the worm shaft on which a worm and a cam are mounted. To effect gear shifting, the motor drives the worm shaft to have the cam abut and displace the clutch and at the same time, the worm drives the gear-shifting hub to thus realize the operation of gear shifting.

6 Claims, 4 Drawing Sheets

GEAR-SHIFTING STRUCTURE FOR VEHICLE

BACKGROUND OF THE INVENTION (a) Technical Field of the Invention

The present invention relates to a gear-shifting structure for a vehicle, and in particular to a gear-shifting structure that integrates the operation of a clutch contained in a transmission box and a power source of gear shifting carried out by a gear-shifting hub.

(b) Description of the Prior Art

For a currently-available vehicle that is equipped with the so-called automated manual transmission (AMT), the operation of gear shifting is done by controlling an automatic clutching operator of a transmission box to cause disengagement or release of a clutch, followed by an automatic gear-shifting operator causing rotation of a gear-shifting hub to carry out gear shifting. Both the clutch and the gear-shifting hub are individually provided with an operator and a motor for carrying out the operation thereof. Thus, an AMT mechanism needs at least two sets of operator and motor. This causes an undesired constraint to the utilization of space and installing two sets of operator and motor also leads to increase of costs.

To overcome such drawbacks, an AMT system for all-terrain vehicles was developed, which, for the purposes of saving space and costs, adopts a single-motor based driving system, wherein the gear-shifting operation and the clutching operation of a clutch are respectively done by the forward and backward rotation of the motor. The motor can moves a gear-shifting hub to carry out the gear shifting operation by driving a ratcheting member and a spring back to an original position, and can use a rocker arm that is coupled to the ratcheting member to carry out the clutching operation.

The adoption of a single motor as described above, although effective in solving the problems related to spatial arrangement and costs, yet is disadvantageous in that to complete a gear shifting operation, the motor has to take operation for both forward and backward rotation. This leads to a delay in time in performing successive gear shifting operations. In addition, there still needs a number of parts and thus the problems of high costs caused by the number of parts have not been yet solved. Further, the utilization of the space inside a transmission is still subjected to undesired constraint so that expanding the size of the gear box is inevitable. In addition, the rocker arm uses the force from the ratcheting member spring to drive a clutch cam, and this leads to poor linearility of the clutch cam. In addition, transmission through the rocker arm also results in poor accumulated precision from the motor to the clutch cam.

In addition, the driving of the gear-shifting hub is done by the ratcheting member, which must be returned to the original position by the spring before the next driving can take place. In case of successive operations of gear shifting, the spring may not respond sufficiently quickly so that the successive operation of gear shifting for this type of gear-shifting system is subjected to constraint.

Thus, it is an issue to be addressed for overcoming the above drawbacks.

SUMMARY OF THE INVENTION

The primary purpose of the present invention is to provide a gear-shifting structure for a vehicle, wherein the vehicle comprises a transmission box that contains therein a gear train, a clutch, a switching fork, a gear-shifting hub, and a motor. The motor cooperates with a worm shaft to actuate the clutching operation of the clutch and to cause movement of the gear-shifting hub in order to carry out the gear shifting operation. The motor has a rotary member that drives the worm shaft on which a worm and a cam are mounted. To effect gear shifting, the motor drives the worm shaft to have the cam abut and displace the clutch and at the same time, the worm drives the gear-shifting hub to thus realize the operation of gear shifting. Thus, the number of parts of the gear-shifting structure is reduced, which leads to effective reduction of cost of the gear-shifting structure and also increases the flexibility of design and further, the use of the interior space of the transmission box is subjected to less constraint caused by the arrangement of the gear-shifting structure and/or expansion of the size of the transmission box due to the constraint set by the arrangement of the gear-shifting structure can be alleviated.

Another objective of the present invention is to provide a gear-shifting structure for a vehicle, wherein with the engagement between a worm of a worm shaft and a worm gear of the gear-shifting hub, precision and smoothness of gear shifting operation can be enhanced.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
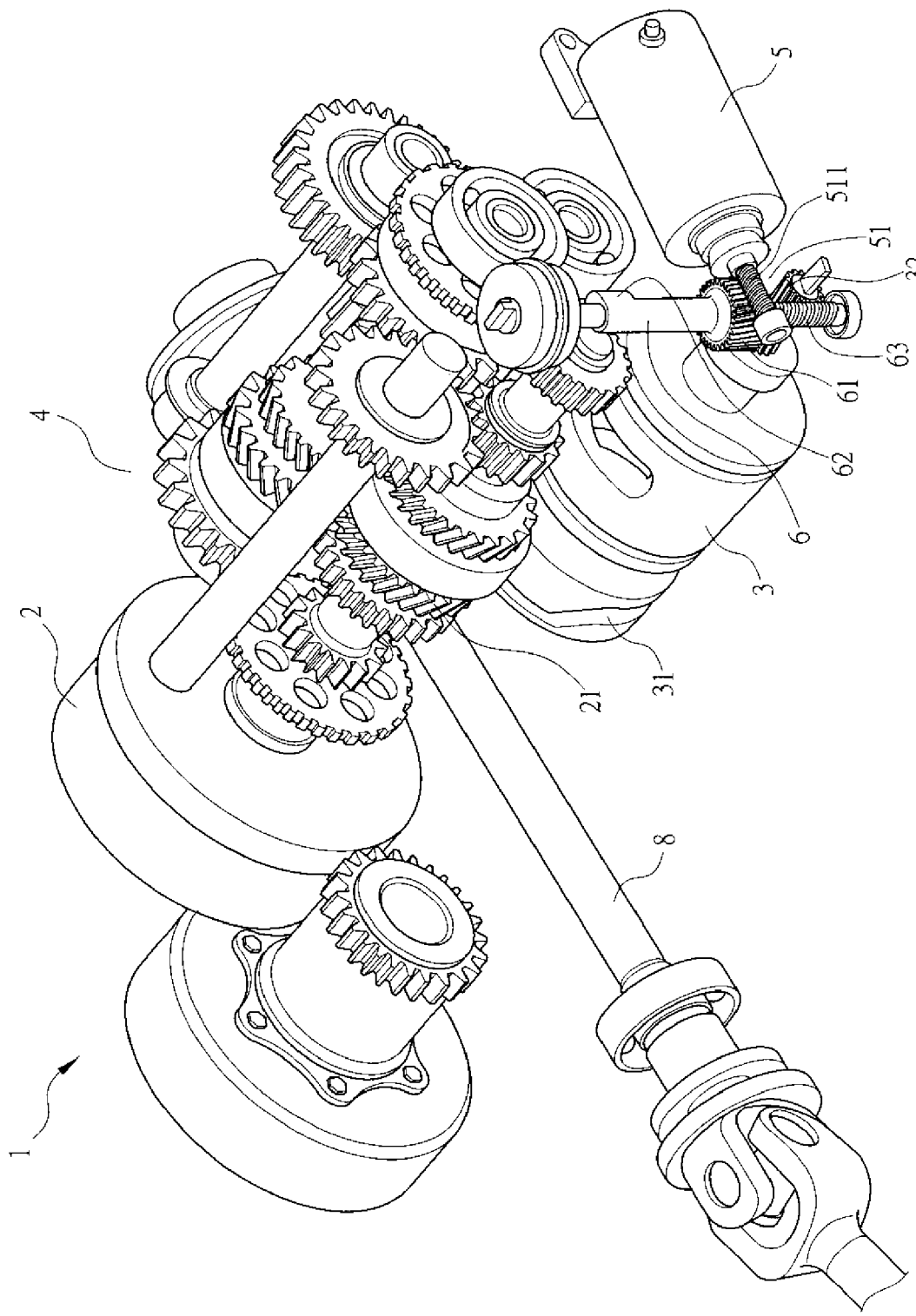
FIG. 1 is a perspective view showing a gear-shifting structure for vehicle in accordance with an embodiment of the present invention.
Figure 2:
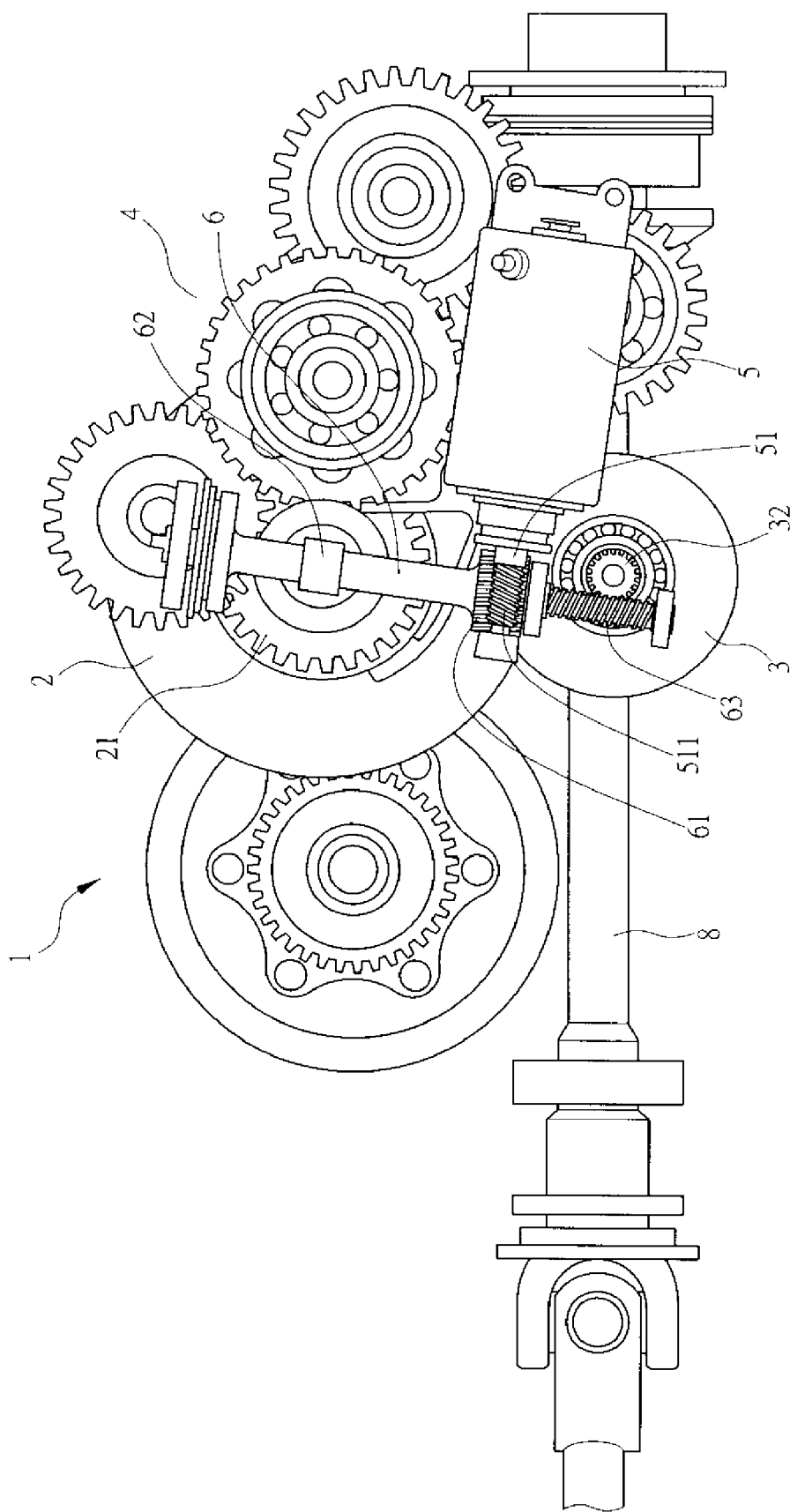
FIG. 2 is a side elevational view of the gear-shifting structure in accordance with the present invention.
Figure 3:
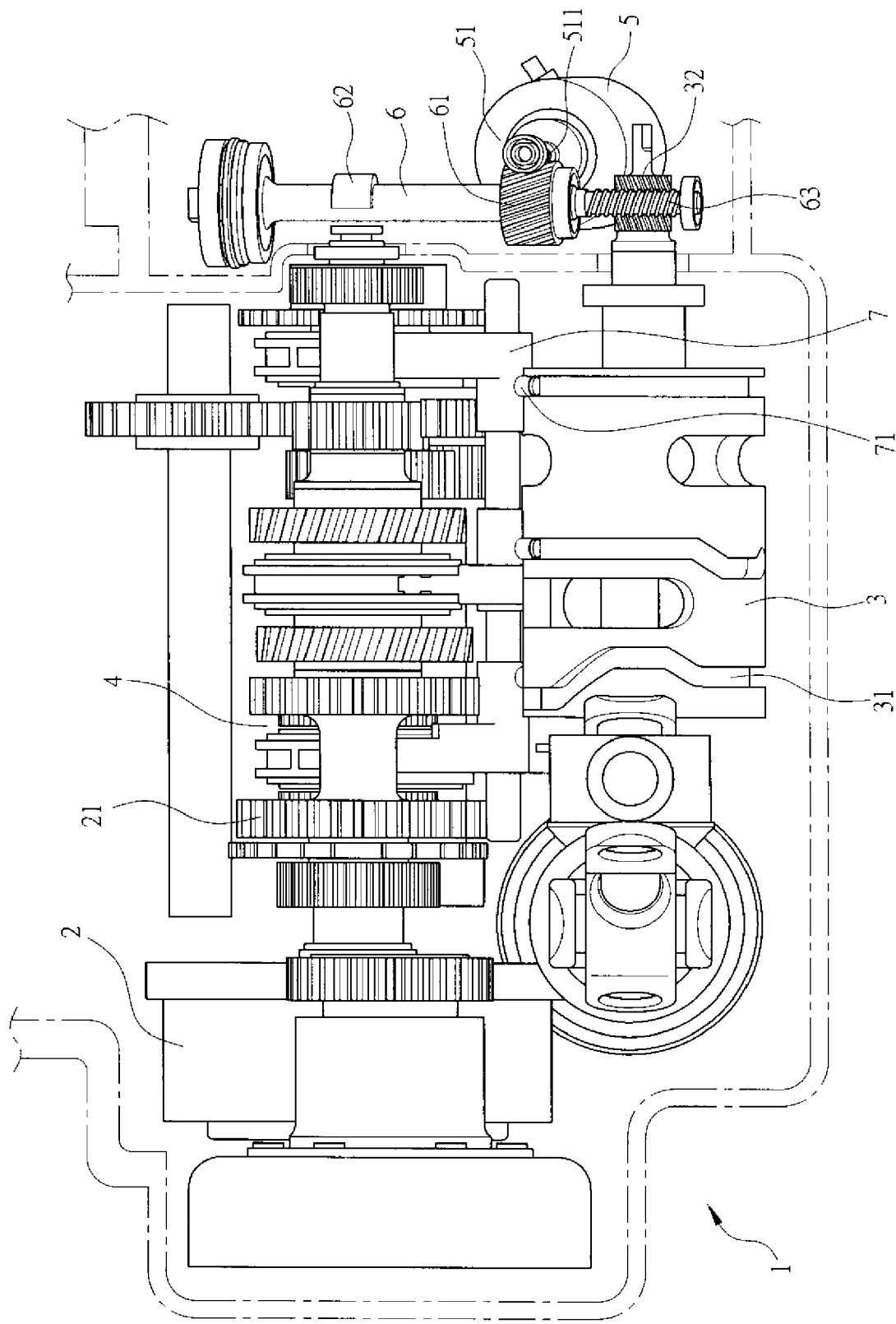
FIGS. 3 and 4 are plan views illustrating a gear shifting operation carried out by the gear-shifting structure in accordance with the present invention.

The present invention relates to a gear-shifting structure for a vehicle, which comprises a power unit that is comprised in part of a transmission box 1. With reference to FIGS. 1, 2, and 3, the transmission box 1 contains therein at least a clutch 2, a gear-shifting hub 3, a gear train 4, a motor 5, a worm shaft 6, and a switching fork 7.

The clutch 2 is driven by the power supplied from a crankshaft (not shown) of the power unit and the clutch 2 is in engagement with gear train 4 to transmit the power to wheels (not shown) trough a transmission axle 8, so as to cause forward or backward movement of the vehicle.

The gear-shifting hub 3 comprises a worm gear 32 that is arranged at an end thereof and mates a worm 63 mounted on the worm shaft 6 for being driven by the worm shaft 6. The gear-shifting hub 3 is further coupled to the gear train 4 by the switching fork 7. The switching fork 7 has a guide pin 71 that is fit in a guide slot 31 defined in the gear-shifting hub 3. Another end of the switching fork 7 is coupled to the gear train 4 so that when the gear-shifting hub 3 is rotated, the switching fork 7 causes engagement of gears of the gear train 4 and the gear 21 of the clutch 2 for setting respective positions and thus realizing gear shifting.

The gear train 4 is composed of various gears of different sizes and is movable by the switching fork 7 to have the gears that correspond to various positions engageable with the gear 21 of the clutch 2 so that the power from the power unit can be transmitted to the transmission axle 8 at different speed for giving the vehicle different power and speed for movement.

The motor 5 has an output end to which a rotary member 51 is provided. The rotary member 51 comprises a worm 511 that mates a worm gear 61 mounted to the worm shaft 6. Thus, the motor 5 drives the rotation of the worm shaft 6 and when the worm shaft 6 is driven by the motor 5, the worm shaft 6 causes displacement of the clutch 2 and rotation of the gear-shifting hub 3 at the same time to thereby realize gear shifting.

The worm shaft 6 comprises at least one worm gear 61 that corresponds to the rotary member 51 of the motor 5 and a cam 62 that abuts and displaces the clutch 2, a worm 63 that mates the worn gear 32 of the gear-shifting hub 3, whereby when the motor 5 causes the worm shaft 6 to rotate, the worm shaft 6 displaces the clutch 2 by means of the cam 62 and at the same time rotates the gear-shifting hub 3 by means of the worm 63 to thereby realizing gear shifting.

Figure 4:
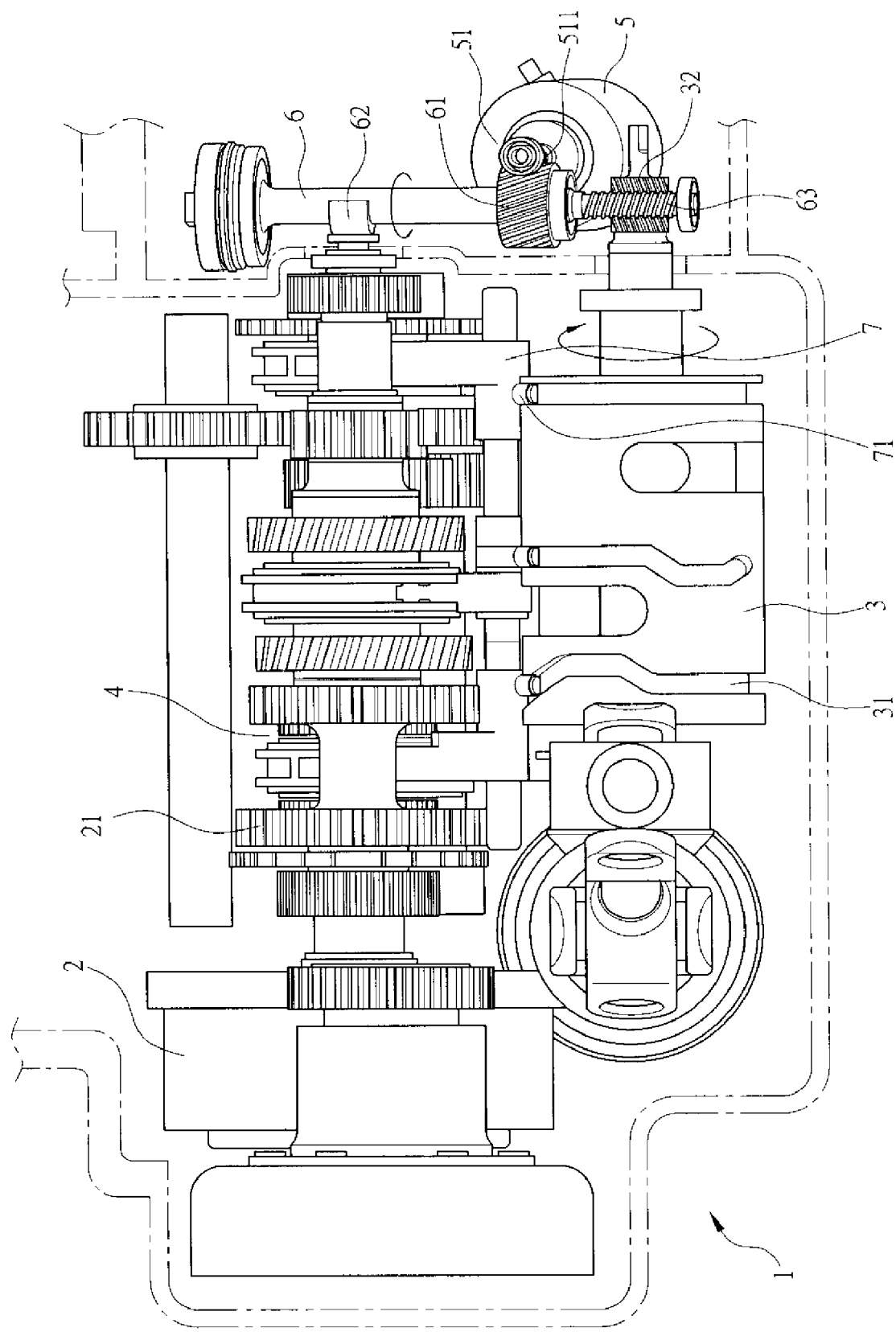

The operation of the present invention will be explained with reference to FIGS. 3 and 4, when an attempt for gear shifting is desired for fulfilling the need for driving a vehicle, the motor 5 is set in operation and the motor 5 uses the engagement between the worm 511 of the rotary member 51 and the worm gear 61 of the worm shaft 6 to drive the rotation of the worm shaft 6. With the worm shaft 6 being driven by the motor 5, the cam 62 of the worm shaft 6 abuts against and thus displaces the clutch 2 to set the clutch 2 in a disengagement condition, in which the power from the power unit is no longer transmitted to the transmission box 1.

At the same time when the cam 62 of the worm shaft 6 displaces the clutch 2, the worm 63 of the worm shaft 6 also causes the gear-shifting hub 3 to rotate. The rotation of the gear-shifting hub 3 causes the switching fork 7 that is fit in the guide slot 31 of the gear-shifting hub 3 to move the gear train 4 to have the gear train 4 engaging the gear 21 of the clutch 2 by the gear thereof corresponding to a desired position thereby completing the gear shifting operation Once the gear shifting operation is completed, the worm shaft 6 is driven by the motor 5 to have the cam 62 no longer in a condition abutting against the clutch 2 so that the clutch 2 restores an engagement condition of being in frictional and contacting engagement to allow the power from the power unit to be transmitted to the wheels through the transmission axle 8 by means of the engagement between the clutch 2 and the gear train 4 thereby causing forward and/or backward movement of the vehicle through properly selected gear position.

The gear-shifting structure of the present invention described above can provides at least has the following effects:

(1) The gear-shifting structure is comprised of only a single motor 5 and a single worm shaft 6 for realizing the gear shifting operation, whereby the number of parts of the gear-shifting structure is reduced, leading to effective reduction of cost of the gear-shifting structure and also increase of the flexibility of design.

(2) The gear-shifting structure uses only one single motor 5 and one single worm shaft 6 to realize gear shifting, whereby the use of the interior space of the transmission box 1 is subjected to less constraint caused by the arrangement of the gear-shifting structure and/or expansion of the size of the transmission box due to the constraint set by the arrangement of the gear-shifting structure can be alleviated.

(3) With the engagement between the worm 63 of the worm shaft 6 and the worm gear 32 of the gear-shifting hub 3, precision and smoothness of gear shifting operation can be enhanced.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A gear-shifting structure for a vehicle, wherein the vehicle comprises a transmission box, which contains therein a gear train, a clutch, a switching fork, a gear-shifting hub, and a motor, the gear-shifting structure being characterized in that the motor comprises a rotary member that drives a worm shaft, on which a worm and a cam are mounted, whereby when a gear shifting operation is carried out, the rotary member of the motor drives the worm shaft so that the cam of the worm shaft abuts against and displaces the clutch and at the same time, the worm of the worm shaft drives the gear-shifting hub to realize the gear shifting operation.

2. The gear-shifting structure as claimed in claim 1, wherein the rotary member comprises a worm.

3. The gear-shifting structure as claimed in claim 1, wherein the worm shaft comprises a worm gear mounted thereon.

4. The gear-shifting structure as claimed in claim 2, wherein the worm of the rotary member of the motor mates a worm gear of the worm shaft.

5. The gear-shifting structure as claimed in claim 1, wherein the gear-shifting hub comprises a worm gear mounted at an end thereof.

6. The e gear-shifting structure as claimed in claim 5, wherein the worm gear of the gear-shifting hub mates the worm of the worm shaft.

* * * * *